United States Patent [19]
Ardohain

[11] Patent Number: 5,897,284
[45] Date of Patent: Apr. 27, 1999

[54] WATER CRAFT LOADING AND UNLOADING APPARATUS

[76] Inventor: Pete Ardohain, 1100 W. Gordon Creek Rd., Price, Utah 84501

[21] Appl. No.: 08/855,009

[22] Filed: May 13, 1997

[51] Int. Cl.[6] .................................................. B65G 67/02
[52] U.S. Cl. ............................................ 414/522; 414/540
[58] Field of Search .................................... 414/522, 540, 414/545, 675, 559, 462, 501, 506, 500; 114/44, 48; 405/3

[56] References Cited

U.S. PATENT DOCUMENTS

| | | |
|---|---|---|
| 3,831,790 | 8/1974 | Farris ........................................ 414/522 |
| 4,212,580 | 7/1980 | Fluck ..................................... 414/559 X |
| 4,976,211 | 12/1990 | Reinhardt ................................... 114/44 |
| 5,064,335 | 11/1991 | Bergeron et al. ......................... 414/522 |
| 5,366,338 | 11/1994 | Mortensen ........................... 414/462 X |
| 5,511,928 | 4/1996 | Ellis ......................................... 414/462 |
| 5,542,810 | 8/1996 | Florus .................................. 414/462 X |
| 5,603,600 | 2/1997 | Egar et al. ............................... 414/462 |
| 5,620,296 | 4/1997 | McMahon et al. ................. 414/462 X |
| 5,730,577 | 3/1998 | Jones ................................... 414/522 X |
| 5,752,799 | 5/1998 | Carey et al. ........................ 414/462 X |

*Primary Examiner*—David A. Bucci

[57] ABSTRACT

A new Water Craft Loading And Unloading Apparatus for allowing generally one person to easily load and unload a water craft. The inventive device includes a receiving hitch insert, a frame a sliding drawer and a pair of winches.

1 Claim, 4 Drawing Sheets

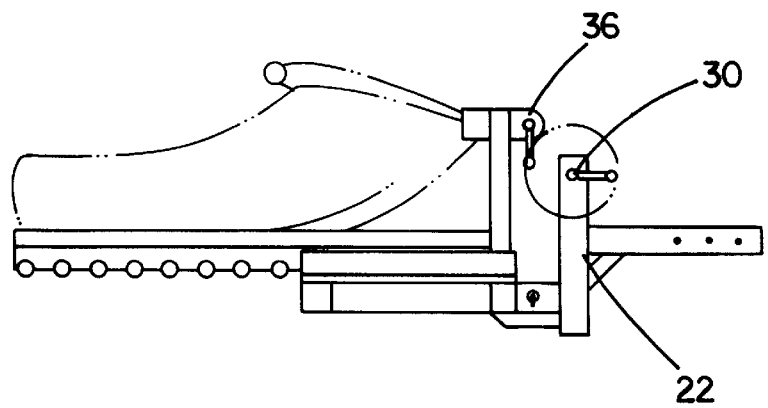
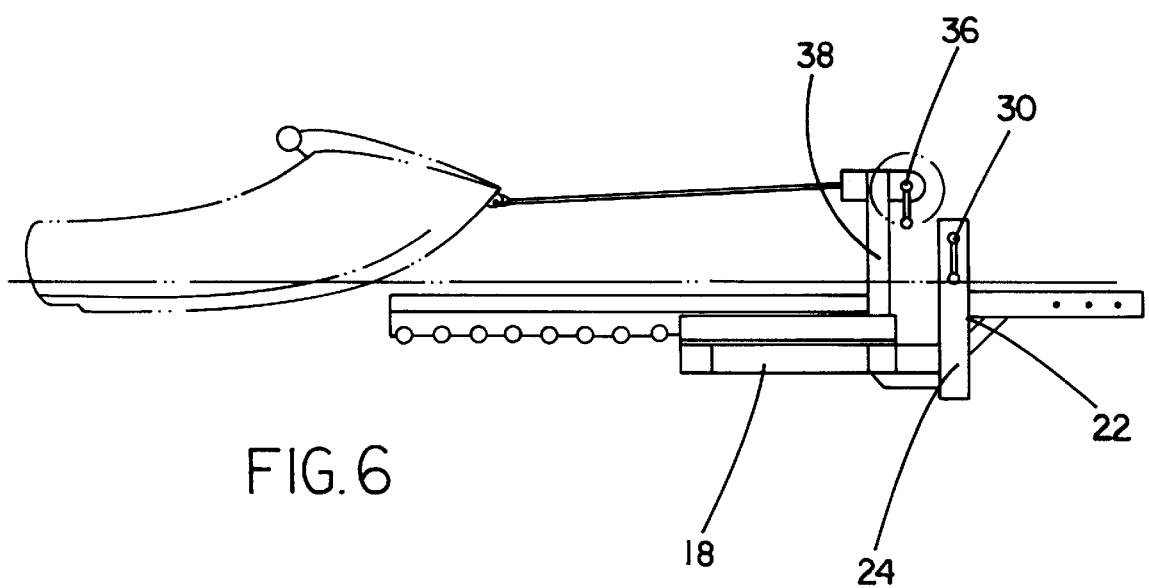

WATER CRAFT LOADING AND UNLOADING APPARATUS

BACKGROUND OF THE INVENTION

1. Field of the Invention

The present invention relates to self loading and carrying apparatus and more particularly pertains to a new Water Craft Loading And Unloading Apparatus for allowing generally one person to easily load and unload a water craft.

2. Description of the Prior Art

The use of self loading and carrying apparatus is known in the prior art. More specifically, self loading and carrying apparatus heretofore devised and utilized are known to consist basically of familiar, expected and obvious structural configurations, notwithstanding the myriad of designs encompassed by the crowded prior art which have been developed for the fulfillment of countless objectives and requirements.

Known prior art self loading and carrying apparatus include U.S. Pat. No. 4,960,358; U.S. Pat. No. 5,249,910; U.S. Pat. No. 5,380,141; U.S. Pat. No. 5,005,846; U.S. Pat. No. 4,930,973 and U.S. Pat. No. 4,934,895.

While these devices fulfill their respective, particular objectives and requirements, the aforementioned patents do not disclose a new Water Craft Loading And Unloading Apparatus. The inventive device includes generally a receiving hitch insert, a frame, a sliding drawer and at least a pair of winches.

In these respects, the Water Craft Loading And Unloading Apparatus according to the present invention substantially departs from the conventional concepts and designs of the prior art, and in so doing provides an apparatus primarily developed for the purpose of allowing generally one person to easily load and unload a water craft.

SUMMARY OF THE INVENTION

In view of the foregoing disadvantages inherent in the known types of self loading and carrying apparatus now present in the prior art, the present invention provides a new Water Craft Loading And Unloading Apparatus construction wherein the same can be utilized for allowing generally one person to easily load and unload a water craft.

The general purpose of the present invention, which will be described subsequently in greater detail, is to provide a new Water Craft Loading And Unloading Apparatus apparatus and method which has many of the advantages of the self loading and carrying apparatus mentioned heretofore and many novel features that result in a new Water Craft Loading And Unloading Apparatus which is not anticipated, rendered obvious, suggested, or even implied by any of the prior art self loading and carrying apparatus, either alone or in any combination thereof To attain this, the present invention generally comprises generally a receiving hitch insert, a frame a sliding drawer and at least a pair of winches.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Water Craft Loading And Unloading Apparatus apparatus and method which has many of the advantages of the self loading and carrying apparatus mentioned heretofore and many novel features that result in a new Water Craft Loading And Unloading Apparatus which is not anticipated, rendered obvious, suggested, or even implied by any of the prior art self loading and carrying apparatus, either alone or in any combination thereof.

It is another object of the present invention to provide a new Water Craft Loading And Unloading Apparatus which may be easily and efficiently manufactured and marketed.

It is a further object of the present invention to provide a new Water Craft Loading And Unloading Apparatus which is of a durable and reliable construction.

An even further object of the present invention is to provide a new Water Craft Loading And Unloading Apparatus which is susceptible of a low cost of manufacture with regard to both materials and labor, and which accordingly is then susceptible of low prices of sale to the consuming public, thereby making such Water Craft Loading And Unloading Apparatus economically available to the buying public.

Still yet another object of the present invention is to provide a new Water Craft Loading And Unloading Apparatus which provides in the apparatuses and methods of the prior art some of the advantages thereof, while simultaneously overcoming some of the disadvantages normally associated therewith.

Still another object of the present invention is to provide a new Water Craft Loading And Unloading Apparatus for allowing generally one person to easily load and unload a water craft.

Yet another object of the present invention is to provide a new Water Craft Loading And Unloading Apparatus which includes a receiving hitch insert, a frame a sliding drawer and at least a pair of winches.

Still yet another object of the present invention is to provide a new Water Craft Loading And Unloading Apparatus that allow s the sliding drawer to move forward with the water-craft onto the receiving hitch to allow the easy loading and unloading of a water-craft..

Even still another object of the present invention is to provide a new Water Craft Loading And Unloading Apparatus that provides a hand crank operated winch that also enables the receiving hitch with the water-craft to be raised and lowered past the rear end of the truck when loading and unloading.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 shows the water-craft being lowered to be placed in the water.

FIG. 6 is another view of the water-craft as it is being lowered into the water.

DESCRIPTION OF THE PREFERRED EMBODIMENT

Figure 1:
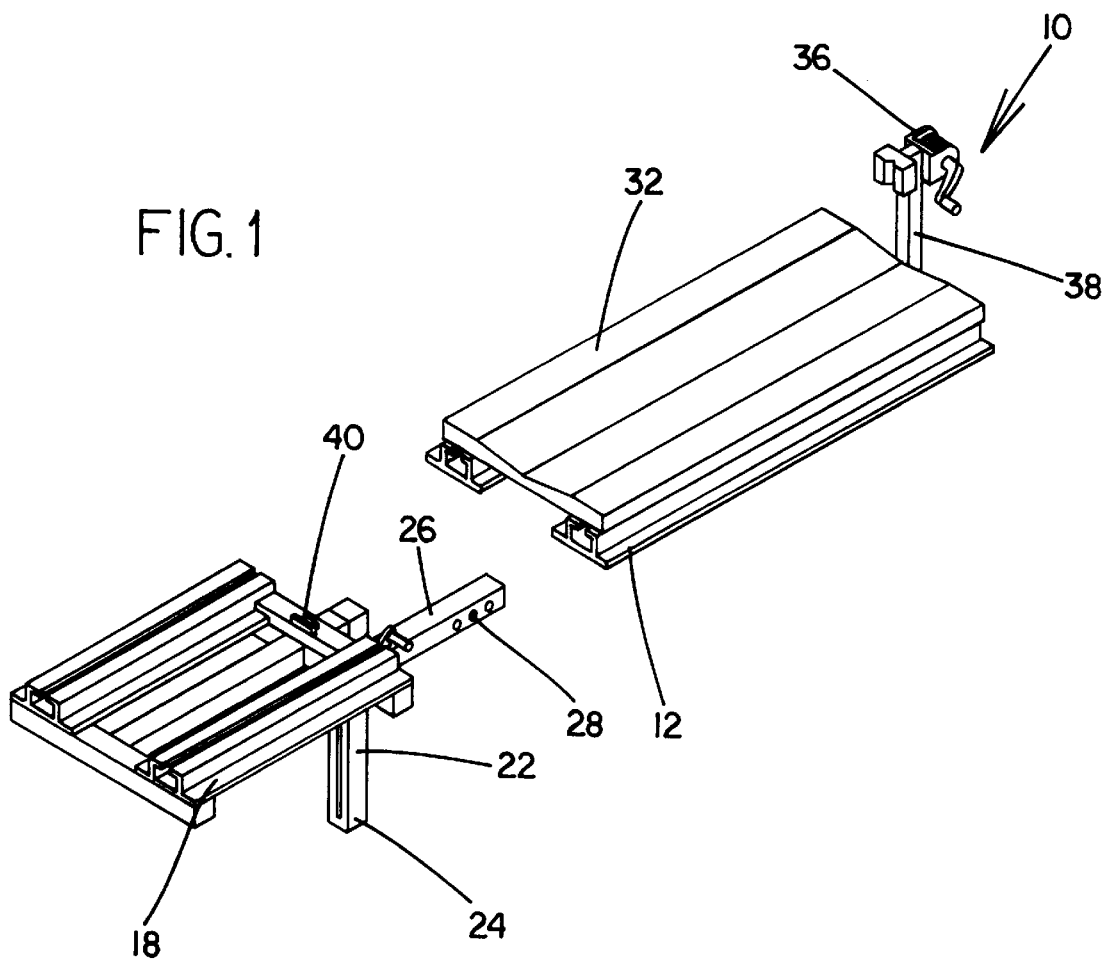
FIG. 1 is a side perspective view of a new Water Craft Loading And Unloading Apparatus according to the present invention.

With reference now to the drawings, and in particular to FIGS. 1 through 8 thereof, a new Water Craft Loading And Unloading Apparatus embodying the principles and concepts of the present invention and generally designated by the reference numeral 10 will be described.

Figure 2:
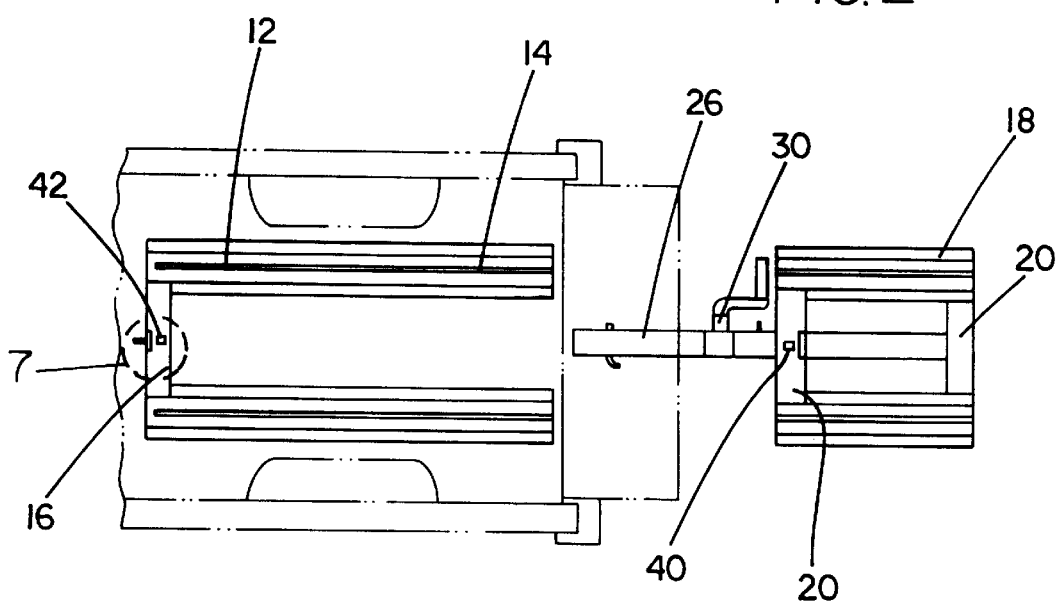
FIG. 2 is a top view of the present invention.
Figure 3:
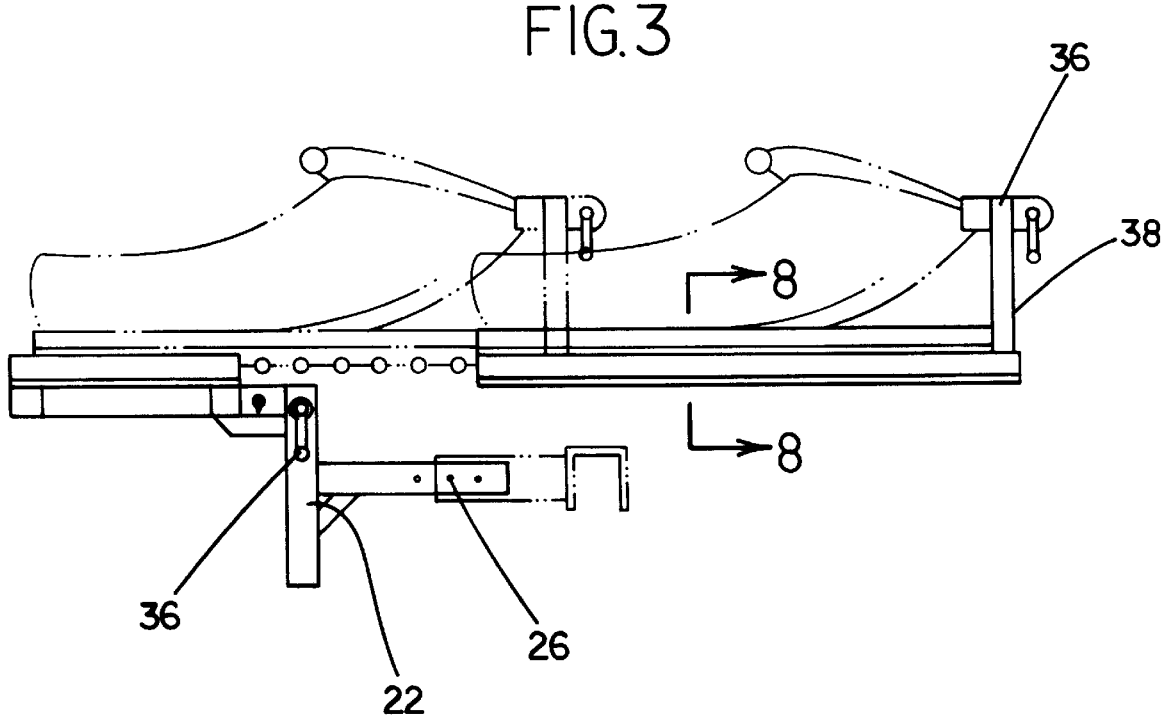
FIG. 3 is a view of the loading, process of a water-craft onto the Water Craft Loading and Unloading Apparatus of present invention.
Figure 8:
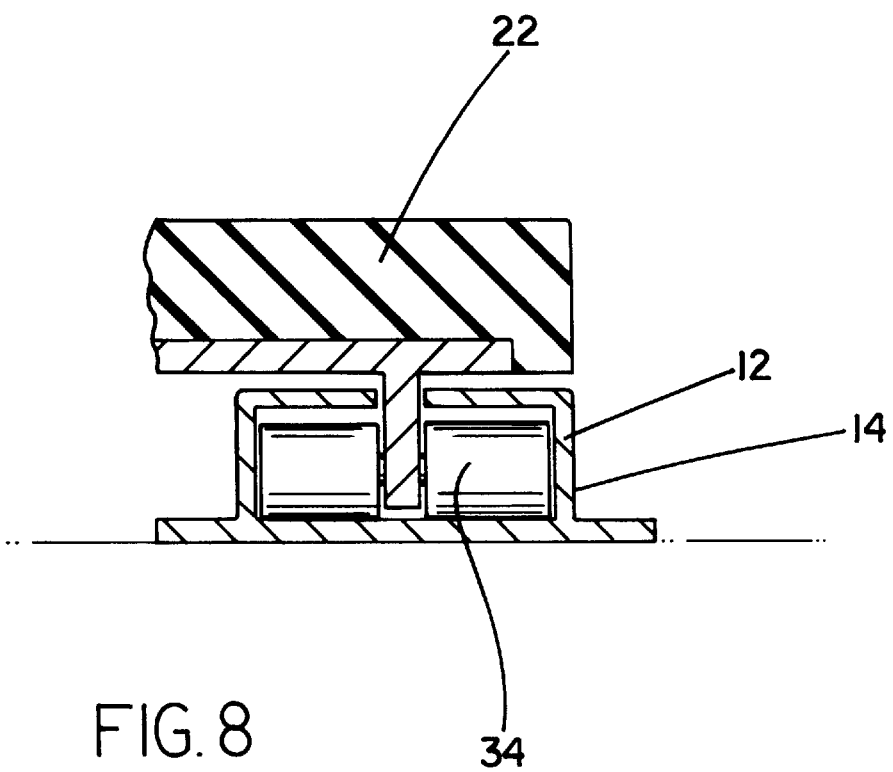
FIG. 8 is the cross-sectional view taken along line 8—8 in FIG. 3.

The present invention, designated as numeral 10, includes a frame 12 bolted to a bed of a truck. The frame includes a pair of parallel guides 14 each defined by a pair of upwardly extending members each having an inwardly extending flange. As such, a channel with a pair of open ends and an upper slot are defined, as shown in FIG. 8. FIG. 2 shows a frame cross bar 16 mounted between front ends of the guides of the frame.

Next provided is a receiving hitch assembly 18 including a pair of parallel guides defined by a pair of upwardly extending members. Similar to the frame, each upwardly extending member has an inwardly extending flange to define a channel with a pair of open ends and an upper slot. The receiving hitch assembly further includes a pair of receiving hitch assembly cross bars 20 mounted between the guides of the receiving hitch assembly for maintaining the same in parallel relationship. See FIG. 2.

Figure 4:
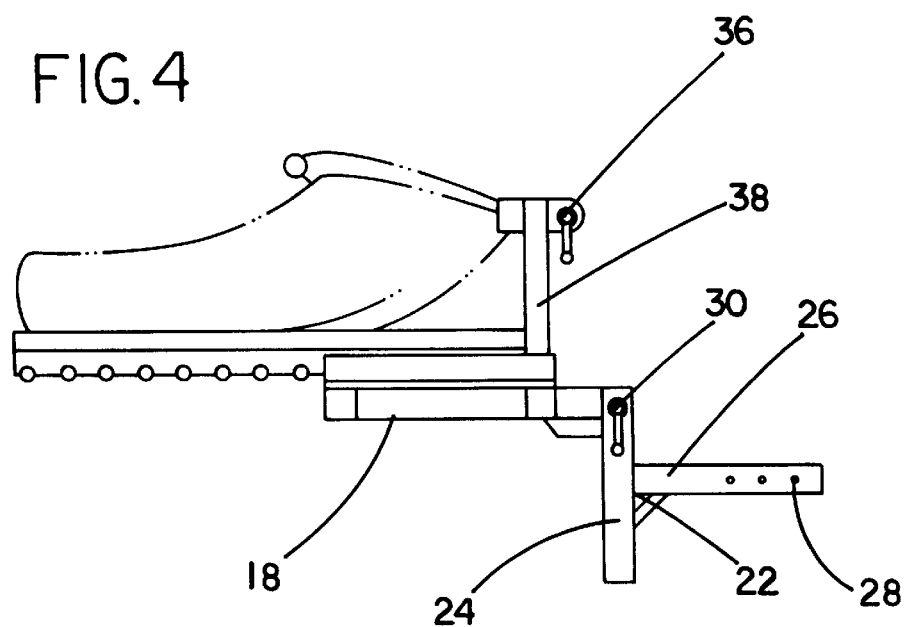
FIG. 4 is a view of the water-craft loaded in on the receiving hitch of the present invention.

FIG. 4 includes a trailer hitch support 22 having a vertically oriented post 24 and a horizontally oriented post 26 coupled to a top end of the vertically oriented post. A plurality of linearly aligned apertures 28 are formed in the horizontally oriented post for releasably coupling with a hitch of the vehicle. The receiving hitch assembly is slidably coupled to the vertically oriented post and further selectively elevated by way of a first winch 30. Note FIGS. 4 & 5.

Figure 7:
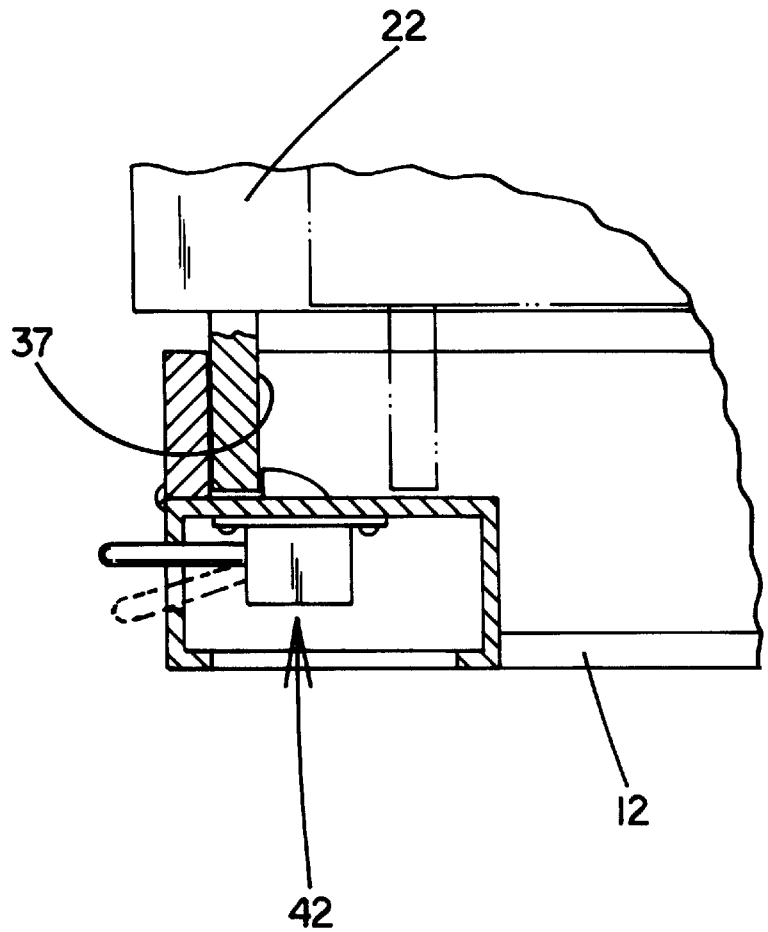
FIG. 7 is a schematic enlarged view of the circular section 7 in FIG. 2.

Also included is a sliding drawer 32 with a rectangular configuration including a pair of downwardly extending members mounted to a bottom face thereof. Each downwardly extending member has wheels 34 mounted on opposite sides thereof. The sliding drawer further includes a second winch 36 mounted to a vertically oriented stanchion 38 mounted on a front of the sliding drawer. As shown in FIG. 8, the wheels are slidably and removably mounted within the channels of the frame and receiving hitch assembly. As shown in FIG. 7, the sliding drawer further includes a downwardly extending portion 37 mounted on a front end thereof.

A first locking assembly 40 is mounted on one of the receiving hitch assembly cross bars for releasably receiving the downwardly extending portion of the sliding drawer. The first locking assembly is adapted for precluding rearward movement of the sliding drawer on the guides of the receiving hitch assembly.

Associated therewith is a second locking assembly 42 mounted on the frame cross bar for releasably receiving the downwardly extending portion of the sliding drawer for precluding rearward movement of the sliding drawer on the guides of the frame. Note FIG. 7. Ideally, the second locking assembly includes a lever and an upwardly extending tang.

In use, the sliding drawer may be locked in place on the receiving hitch assembly by way of the first locking assembly and a watercraft may be positioned on the sliding drawer via the second winch. Thereafter, the first winch may be used to elevate the sliding drawer such that the sliding drawer may be received by the frame whereat the sliding drawer may be locked in place by the second locking assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A watercraft loading and unloading apparatus comprising:

a frame for being bolted to a bed of a truck and including a pair of parallel guides each defined by a pair of upwardly extending members each having an inwardly extending flange to define a channel with a pair of open ends and an upper slot, wherein a frame cross bar is mounted between front ends of the guides of the frame;

a receiving hitch assembly including a pair of parallel guides defined by a pair of upwardly extending members each having an inwardly extending flange to define a channel with a pair of open ends and an upper slot, the receiving hitch assembly further including a pair of receiving hitch assembly cross bars mounted between the guides of the receiving hitch assembly for maintaining the same in parallel relationship;

a trailer hitch support including a vertically oriented post, a horizontally oriented post coupled to a top end of the vertically oriented post with a plurality of linearly aligned apertures formed therein for being releasably coupled with a hitch of the truck, wherein the receiving hitch assembly is slidably coupled to the vertically oriented post and further selectively elevated by way of a first winch;

a sliding drawer with a rectangular configuration including a pair of downwardly extending members mounted to a bottom face thereof and each having wheels mounted on opposite sides thereof, the sliding drawer further including a second winch mounted to a vertically oriented stanchion coupled on a front of the sliding drawer, wherein the wheels are slidably and removably mounted within the channels of the frame and receiving hitch assembly, the sliding drawer further including a downwardly extending portion mounted on a front end thereof;

a first locking assembly mounted on one of the receiving hitch assembly cross bars for releasably receiving the downwardly extending portion of the sliding drawer for precluding rearward movement of the sliding drawer on the guides of the receiving hitch assembly; and a second locking assembly mounted on the frame cross bar for releasably receiving the downwardly extending portion of the sliding drawer for precluding rearward movement of the sliding drawer on the guides of the frame, the second locking assembly including a lever and an upwardly extending tang;

wherein the sliding drawer may be locked in place on the receiving hitch assembly by way of the first locking assembly and a watercraft may be positioned on the sliding drawer via the second winch after which the first winch may be used to elevate the sliding drawer such that the sliding drawer may be received by the frame whereat the sliding drawer may be locked in place by the second locking assembly.

* * * * *